US 7,978,695 B2

(12) United States Patent
George et al.

(10) Patent No.: US 7,978,695 B2
(45) Date of Patent: Jul. 12, 2011

(54) HARDWARE-ENFORCED LOOP AND NPIV HARD ZONING FOR FIBRE CHANNEL SWITCH FABRIC

(75) Inventors: William R. George, Minneapolis, MN (US); Frank R. Dropps, Maple Grove, MN (US)

(73) Assignee: QLogic Switch Products, Inc., Eden Prairie, MN (US)

( * ) Notice: Subject to any disclaimer, the term of this patent is extended or adjusted under 35 U.S.C. 154(b) by 486 days.

(21) Appl. No.: 11/858,684

(22) Filed: Sep. 20, 2007

(65) Prior Publication Data

US 2008/0095152 A1 Apr. 24, 2008

Related U.S. Application Data

(63) Continuation-in-part of application No. 11/765,724, filed on Jun. 20, 2007, which is a continuation of application No. 10/310,653, filed on Dec. 5, 2002, now Pat. No. 7,248,580, which is a continuation of application No. PCT/US01/18159, filed on Jun. 5, 2001.

(60) Provisional application No. 60/209,413, filed on Jun. 5, 2000.

(51) Int. Cl.
H04L 12/28 (2006.01)

(52) U.S. Cl. ........................................ 370/389; 370/466

(58) Field of Classification Search .................. 370/389, 370/466; 395/286
See application file for complete search history.

(56) References Cited

U.S. PATENT DOCUMENTS

| 4,162,375 | A | 7/1979 | Schlichte |
| 4,425,640 | A | 1/1984 | Philip et al. |
| 4,475,192 | A | 10/1984 | Fernow et al. |
| 4,546,468 | A | 10/1985 | Christmas et al. |

(Continued)

FOREIGN PATENT DOCUMENTS

EP 0649098 9/1994

(Continued)

OTHER PUBLICATIONS

Clark, Tom, "Zoning for Fibre Channel Fabrics", *Vixel Corporation Paper—XP002185194*, (Aug. 31, 1999), 1-6.

(Continued)

*Primary Examiner* — Dang T Ton
*Assistant Examiner* — Wei Zhao
(74) *Attorney, Agent, or Firm* — Schwegman, Lundberg & Woessner, P.A.

(57) ABSTRACT

Hardware-enforced zoning is provided in Fiber Channel switches to protect against breaching of assigned zones in a switch network which can occur with software-based zoning techniques. The invention provides logic for performing a hardware-based validation of the Source ID S_ID of frames both at the point where the frame enters the Fiber Channel fabric, and at the point where the frame leaves the fabric. The S_ID is verified against an inclusion list or table of allowable S_IDs, which can be unique for each fabric port. The invention provides a way to increase the range of sources an inclusion table can express, by implementing wild cards, on an entry-by entry basis. If the S_ID is valid, it will enter the fabric and route normally. If invalid, the frame will not be routed but will be disposed of by the fabric according to FC rules. This prevents incorrect S_IDs from breaching the table-driven zoning at the point where frames exit the fabric, to prevent unauthorized access to devices connected to the switch network.

16 Claims, 5 Drawing Sheets

U.S. PATENT DOCUMENTS

| | | |
|---|---|---|
| 4,569,043 A | 2/1986 | Simmons et al. |
| 4,725,835 A | 2/1988 | Schreiner et al. |
| 4,821,034 A | 4/1989 | Anderson et al. |
| 5,144,622 A | 9/1992 | Takiyasu et al. |
| 5,367,520 A | 11/1994 | Cordell |
| 5,528,591 A | 6/1996 | Lauer |
| 5,598,541 A * | 1/1997 | Malladi ........................ 710/106 |
| 5,610,745 A | 3/1997 | Bennett |
| 5,619,497 A | 4/1997 | Gallagher et al. |
| 5,633,867 A | 5/1997 | Ben-Nun et al. |
| 5,687,172 A | 11/1997 | Cloonan et al. |
| 5,748,612 A | 5/1998 | Stoevhase et al. |
| 5,818,842 A | 10/1998 | Burwell et al. |
| 5,825,748 A | 10/1998 | Barkey et al. |
| 5,987,028 A | 11/1999 | Yang et al. |
| 5,999,528 A | 12/1999 | Chow et al. |
| 6,014,383 A | 1/2000 | McCarty |
| 6,021,128 A | 2/2000 | Hosoya et al. |
| 6,047,323 A | 4/2000 | Krause |
| 6,081,512 A | 6/2000 | Muller et al. |
| 6,118,776 A | 9/2000 | Berman |
| 6,128,292 A | 10/2000 | Kim et al. |
| 6,160,813 A | 12/2000 | Banks et al. |
| 6,185,203 B1 | 2/2001 | Berman |
| 6,289,386 B1 | 9/2001 | Vangemert |
| 6,308,220 B1 | 10/2001 | Mathur |
| 6,324,181 B1 | 11/2001 | Wong et al. |
| 6,330,236 B1 | 12/2001 | Ofek et al. |
| 6,411,599 B1 | 6/2002 | Blanc et al. |
| 6,424,658 B1 | 7/2002 | Mathur |
| 6,449,274 B1 | 9/2002 | Holden et al. |
| 6,470,007 B1 | 10/2002 | Berman |
| 6,484,173 B1 | 11/2002 | O'Hare et al. |
| 6,597,691 B1 | 7/2003 | Anderson et al. |
| 6,647,019 B1 | 11/2003 | McKeown et al. |
| 6,697,359 B1 | 2/2004 | George |
| 6,718,139 B1 | 4/2004 | Finan et al. |
| 6,735,174 B1 | 5/2004 | Hefty et al. |
| 6,765,919 B1 * | 7/2004 | Banks et al. ................. 370/401 |
| 6,785,241 B1 | 8/2004 | Lu et al. |
| 6,839,747 B1 | 1/2005 | Blumenau et al. |
| 6,904,053 B1 * | 6/2005 | Berman ........................ 370/466 |
| 6,980,525 B2 | 12/2005 | Banks et al. |
| 7,165,152 B2 | 1/2007 | Blumenau et al. |
| 7,248,580 B2 | 7/2007 | George et al. |
| 7,408,927 B2 | 8/2008 | George |
| 7,443,794 B2 | 10/2008 | George et al. |
| 7,684,398 B2 | 3/2010 | George et al. |
| 2001/0038628 A1 | 11/2001 | Ofek et al. |
| 2003/0016683 A1 | 1/2003 | George et al. |
| 2003/0179748 A1 | 9/2003 | George et al. |
| 2004/0028038 A1 | 2/2004 | Anderson et al. |
| 2004/0141521 A1 | 7/2004 | George |
| 2008/0002687 A1 | 1/2008 | George et al. |
| 2009/0046731 A1 | 2/2009 | George et al. |

FOREIGN PATENT DOCUMENTS

| | | |
|---|---|---|
| EP | 0856969 | 1/1998 |
| JP | 07058770 | 3/1995 |
| JP | 2000134258 | 5/2000 |
| WO | WO-98/36537 | 8/1998 |

OTHER PUBLICATIONS

Malavalli, Kumar, et al., "Distributed computing with fibre channel fabric", *Proc. of the Computer Soc. Int'l Conf.*, Los Alamitos, IEEE Comp Soc. Press., vol. Conf. 37, XP000340745, , (Feb. 24, 1992), 269-274.

Martin, Charles, R., "Fabric interconnection of fibre channel standard nodes", *Proceedings of the SPIE*, (Sep. 8, 1992), 65-71.

Yoshida, H., "LUN Security Considerations for Storage Area Networks", (1999), 1-4.

"U.S. Appl. No. 11/765,724 Notice of Allowance Mailed Nov. 2, 2009", 13 pgs.

"U.S. Appl. No. 12/235,210, Preliminary Amendment filed Sep. 22, 2008", 11 pgs.

"U.S. Appl. No. 12/235,210, Response filed Mar. 25, 2010 to Non Final Office Action mailed Mar. 17, 2010", 11 pgs.

"U.S. Appl. No. 12/235,210 , Non-Final Office Action mailed Mar. 17, 2010", 11 pgs.

"Japanese Application Application Serial No. 2002-502983, Office Action mailed Dec. 9, 2010", 7.

* cited by examiner

HARDWARE-ENFORCED LOOP AND NPIV HARD ZONING FOR FIBRE CHANNEL SWITCH FABRIC

CROSS-REFERENCE TO RELATED APPLICATIONS

This application is a continuation-in-part of U.S. application Ser. No. 11/765,724, filed Jun. 20, 2007, which is a continuation of U.S. application Ser. No. 10/310,653, filed Dec. 5, 2002, now issued as U.S. Pat. No. 7,248,580, which is a continuation under 35 U.S.C. 111(a) of PCT/US01/18159, filed Jun. 5, 2001, which claims priority to U.S. Provisional Patent Application Ser. No. 60/209,413, filed Jun. 5, 2000, which applications are incorporated herein by reference.

FIELD OF THE INVENTION

This invention pertains generally to the field of high performance switching, and in particular to improvements in Fibre Channel switching to provide the establishment of zones for permitted access to connected devices, with hardware-enforcement of the zoning.

BACKGROUND OF THE PRIOR ART

The Fibre Channel standard has been established to provide for high performance switching solutions for computing and data handling systems. Examples of applications where the high speed and high bandwidth of Fibre Channel switches may be used to advantage include interconnecting computers and high-performance storage devices, interconnecting computers in multiple-computer operating environments, and anywhere multiple high-speed data interconnections must be established between designated nodes or groups of nodes in data handling networks.

The Fibre Channel standard, ANSI X3.T11, broadly defines classes and standards of function and performance, but does not dictate the implementation technologies to be used in providing these functions. A particular design of a switch to implement Fibre Channel functions is referred to as the 'fabric' of the switch. As this invention is directed to improvements in Fibre Channel switches, the description of the invention herein uses terminology and other defined terms from the field of Fibre Channel (referred to by the notation "FC" below) switches, and the FC standard may be consulted for definitions.

For data integrity and security reasons, it is necessary in some networks to make certain that certain hosts or devices have controlled access. For example, certain hosts may be allowed access to only certain storage devices, and vice versa. This requirement means that certain channels or groups of channels to which the affected hosts or devices are attached must be isolated from communication to or from other channels or groups of channels. Zoning techniques are used in prior art systems to define zones of addresses that will be considered valid for various sources or destinations connected to a switch.

Soft Zoning: The Problem

A problem with Fibre Channel zoning as it presently exists is that it is software-enforced zoning, often referred to as soft zoning. In soft zoning, devices connected to N_Ports and NL_Ports of the FC fabric login to the fabric and make queries of the Name Server to determine which of the remote devices this device can communicate with, along with their FC addresses (D_IDs). The Name Server defines and enforces the zones by listing in the login response the set of devices (by D_ID) that are in the login requester's zone or zones. In this manner, devices honor zones by using only those D_IDs given out by the Name Server.

However, this works only if all devices follow the rules, and there are no hardware failures. Soft zoning can be breached in the following ways.

Zones can be breached inadvertently by HBA software errors that generate incorrect D_IDs.

Zones can be breached by hardware failures, where the D_ID is corrupted somewhere between the source device and the destination device.

Zones can be breached deliberately by ill-mannered but non-malicious HBAs, such as those that walk through all D_IDs to discover where other HBAs are attached.

Zones can be breached maliciously by HBAs where the intent is to disrupt a system.

SUMMARY OF THE INVENTION

The present invention solves the problems discussed which are inherent with soft zoning systems by providing hardware-enforced zoning, also referred to herein as hard zoning. Hard zoning prevents breaching of assigned zoning by the accidental or intentional soft zoning problems discussed above, thereby improving system data integrity and security.

Hard zoning solves the soft zoning problems by using a hardware check of the frame's Source ID (S_ID) both at the point the frame enters the fabric, and at the point the frame leaves the fabric.

As shown in FIG. 1, according to the invention, the frame S_ID is validated at the point the frame enters the fabric (at an F_Port or FL_Port, but not an E_Port) to prevent incorrect S_IDs from breaching the table-driven zoning at the point where frames exit the fabric. If the S_ID is valid, it will enter the fabric and route normally. If invalid, the frame will not be routed but will be disposed of by the fabric according to FC rules.

The frame S_ID is validated at the point the frame exits the fabric (at an F_Port or FL_Port, but not an E_Port), to insure that the frame, based on the S_ID, is part of the zone or zones that the attached N_Port or NL_Port belongs to. Frame S_IDs are compared against a list of S_IDs that are valid for that port, where the size of the list is implementation-dependent, and where each entry defines a source that is allowed to transmit frames to this destination. If the S_ID matches an entry in the list, it is routed out of the fabric to the destination. If the S_ID does not match any entry in the list, the frame is not passed to the destination, but is disposed of by the fabric according to FC rules.

This method works both for fabric clouds containing homogenous switch devices connected together by E_Ports, and clouds containing heterogeneous switch devices connected together by E_Ports, providing all switch devices use S_ID-based hard zoning in the manner described above.

The method also partially works when some heterogeneous devices are equipped with S_ID hard zoning and others are not. In this case, the devices so equipped are offered full hard zoning protection except from frames entering the fabric from devices not so equipped, whose S_ID is incorrect.

The method also works when in devices so equipped, some fabric ports are deliberately excluded from hard zoning protection, producing a deliberate half-duplex hard zoning case. This can be done to work around the limitations of the Hard Zoning S_ID Inclusion List, which has a finite range.

The hard zoning methods and switches of the present invention provide a number of advantageous features, which include the following:

The methods and techniques of the present invention provides a form of hard zoning in a switch fabric that is performed by hardware verification of frame S_IDs against an inclusion list of allowable S_IDs, before the frame is allowed to exit the fabric.

The invention allows multiple overlapping hard zones for any destination (N_Port or NL_Port) across the largest of FC fabrics. The S_ID inclusion list is based on 24-bit addresses, allowing zones to be comprised of any nodes within the entire Fibre Channel 16,777,216 address space.

The invention allows multiple overlapping hard zones to be implemented at the finest FC addressing granularity, which is down to the loop or N_Port ID Virtualization (NPIV) device, both at the frame source and the frame destination, where each of the 126 possible nodes on a loop or 256 NPIV devices can express unique zone characteristics.

The invention accomplishes hard zoning at a fabric destination F_Port or FL_Port by an Inclusion Table, unique to each fabric port, of legal S_ID values. The Inclusion Table is used by hardware to pass legal frames, and bar illegal frames. This mechanism guards against intentional and un-intentional zone boundary violations.

The invention implements the Inclusion Table as a programmable hardware table, implemented as a CAM, containing multiple entries, each entry containing a 24-bit S_ID value, along with various comparison controls. A single entry typically represents a single source, such as an N_Port attached to an F_Port, or an NL_Port attached to an FL_Port.

The invention provides a way to increase the range of sources an Inclusion Table can express, by implementing wild cards, on an entry-by entry basis, which can disable the comparison of the Port value, or the Port and Area values, of the S_ID. A single entry can then express all Ports within an Area, or all Ports and Areas within a Domain.

The invention allows the flexibility of ranges to increase, by implementing exceptions to a range. A single entry defines the range, and one or more entries define exceptions to the range.

The invention prevents zone breaching via false S_IDs, by implementing S_ID validation against the ports native ID as frames enter the fabric. Valid S_IDs route normally, invalid S_IDs are not routed.

The invention allows an F_Port and its attached N_Port to belong to as many zones as the S_ID inclusion list allows.

The invention allows multiple zones per switch F_Port or FL_Port, and overlapping zones on a loop. The number of zones supported on a F_Port or FL_Port is variable (n), is at least 2, and may be as high as requirements allow. Any loop device or NPVI (based on Port or AL_PA) can belong to 1 to n zones.

The invention's restrictions on the total number of zones on an F_Port, or the total number of zones on a loop, does not place restrictions on the total number of zones in a fabric.

The invention works across fabrics comprising a single switch element (Domain), fabrics comprising multiple homogeneous switches connected together by E_Ports, and across fabrics comprising heterogeneous switches connected together by E_Ports.

The invention allows certain frame types to be unaffected by zoning. Frames with FC Well-Known S_IDs, and any frame sourced by the fabric itself, are excluded from zoning, i.e., they will always route.

The invention allows known "ill-mannered" S_IDs to be recognized in hardware, allowing a different disposition for these frames, such as immediate tossing rather than being processed as an exception by the fabric manager.

The invention applies both to duplex zoning, where bidirectional traffic hard zoning is enforced on both ends, and half-duplex zoning where hard zoning is enforced on one end but not the other. Half-duplex zoning can solve limitations of the S_ID Inclusion Table for some topologies, and is a requirement when a fabric cloud contains multiple switch types, where some employ hard zoning and others do not.

DETAILED DESCRIPTION OF THE PREFERRED EMBODIMENTS

The overall operation of S_ID validation is discussed above with reference to FIG. 1. Detailed operation is described below with reference to the Figures and tables.

Source Fabric F_Port or FL_Port S_ID Validation

Figure 1:
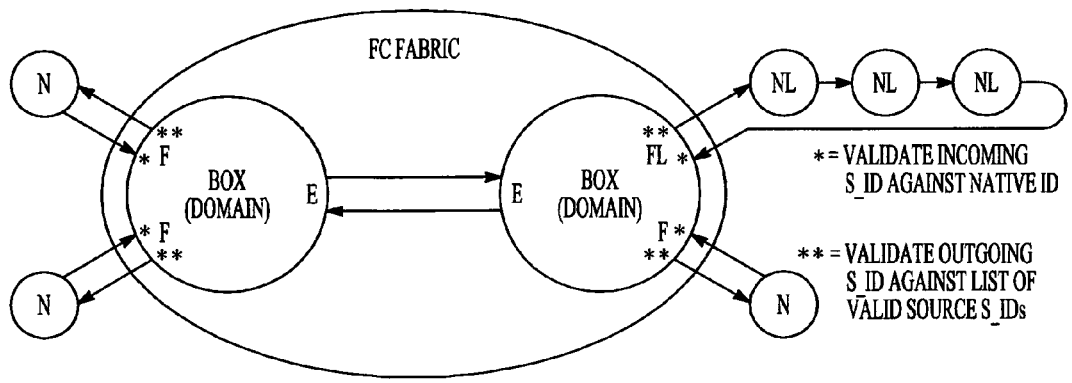
FIG. 1 is a symbolic representation of a FC fabric cloud, showing S_ID validation points according to one aspect of the invention.
Figure 2:
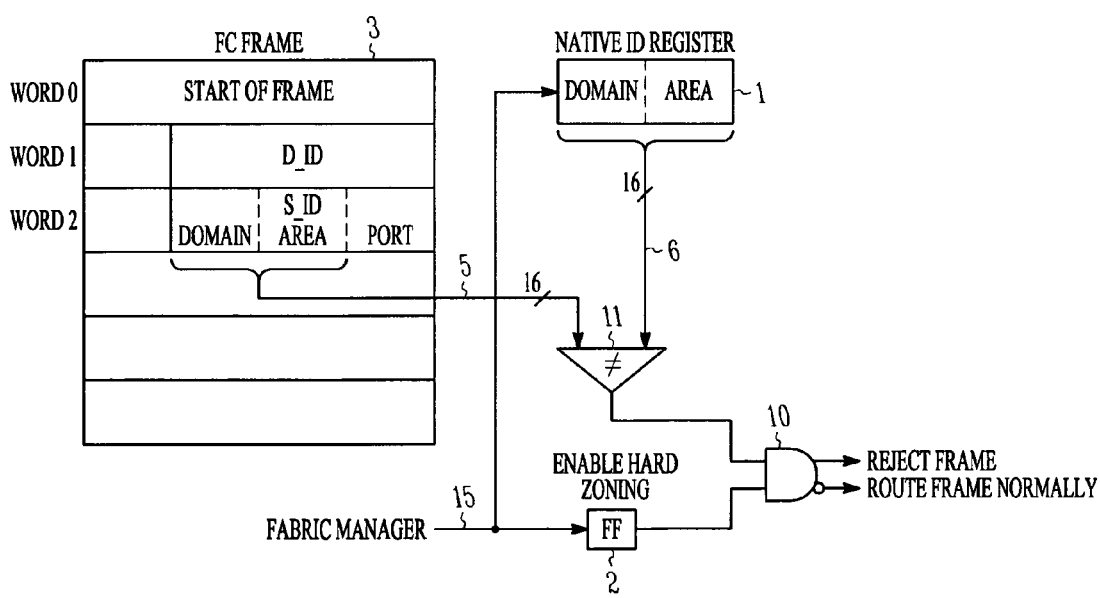
FIG. 2 is a block diagram of a portion of a fabric showing source F_Port or FL_Port S_ID validation according to one aspect of the invention.

FIG. 1 shows the technique for source fabric F Port or FL_Port S_ID validation. This ensures that incoming frame S_ID values are legal, in order that the Hard Zoning mechanism will be effective. This feature requires an enable/disable control, because it should be enabled only on F_Ports and FL_Ports, but not on E_Ports.

The Native ID register (1) is resident to the fabric F_Port logic, and is typically written by the fabric manager (15) to whatever ID has been chosen for the port, but may be hard-wired into the logic in a simpler design with greater operating restrictions. The Native ID is the Domain and Area of the F_Port or FL_Port. The Enable Hard Zoning FF (2) is also resident to the fabric F_Port logic and written by the fabric manager (15), which enables the feature on F_Ports and FL_Ports, but disables it on E_Ports.

The incoming frame (3) is parsed and the S_ID contents (bits 23:0) of frame word 2 are presented to this circuitry. The frame S_ID Domain and Area (5), bits 23-8 of frame word 2, are compared against the Native ID Register (1) Domain and Area (6) in comparator (11). Match/mismatch is fed to gate (14).

If there is a miscompare, and Enable Hard Zoning (2) is active, then gate (10) specifies an invalid frame S_ID. In this case, the frame is not routed normally (it will never reach the intended destination), but is typically forwarded to the fabric manager for processing according to Fibre Channel rules for switches. This typically means that a Class 2 frame that fails the S_ID test spawns a response back to the sender with reason code, and that a Class 3 frame that fails the S_ID test is tossed.

If there is no miscompare in the frame S_ID, or if Enable Hard Zoning (2) is inactive, then gate (10) specifies that the frame will route normally, which means it will route to the fabric destination N_Port or NL_Port specified by the frame D_ID.

This feature ensures that frames entering the fabric are not forwarded if the S_ID is illegal in any way.

Destination Fabric F_Port or FL_Port S_ID Validation

Figure 3:
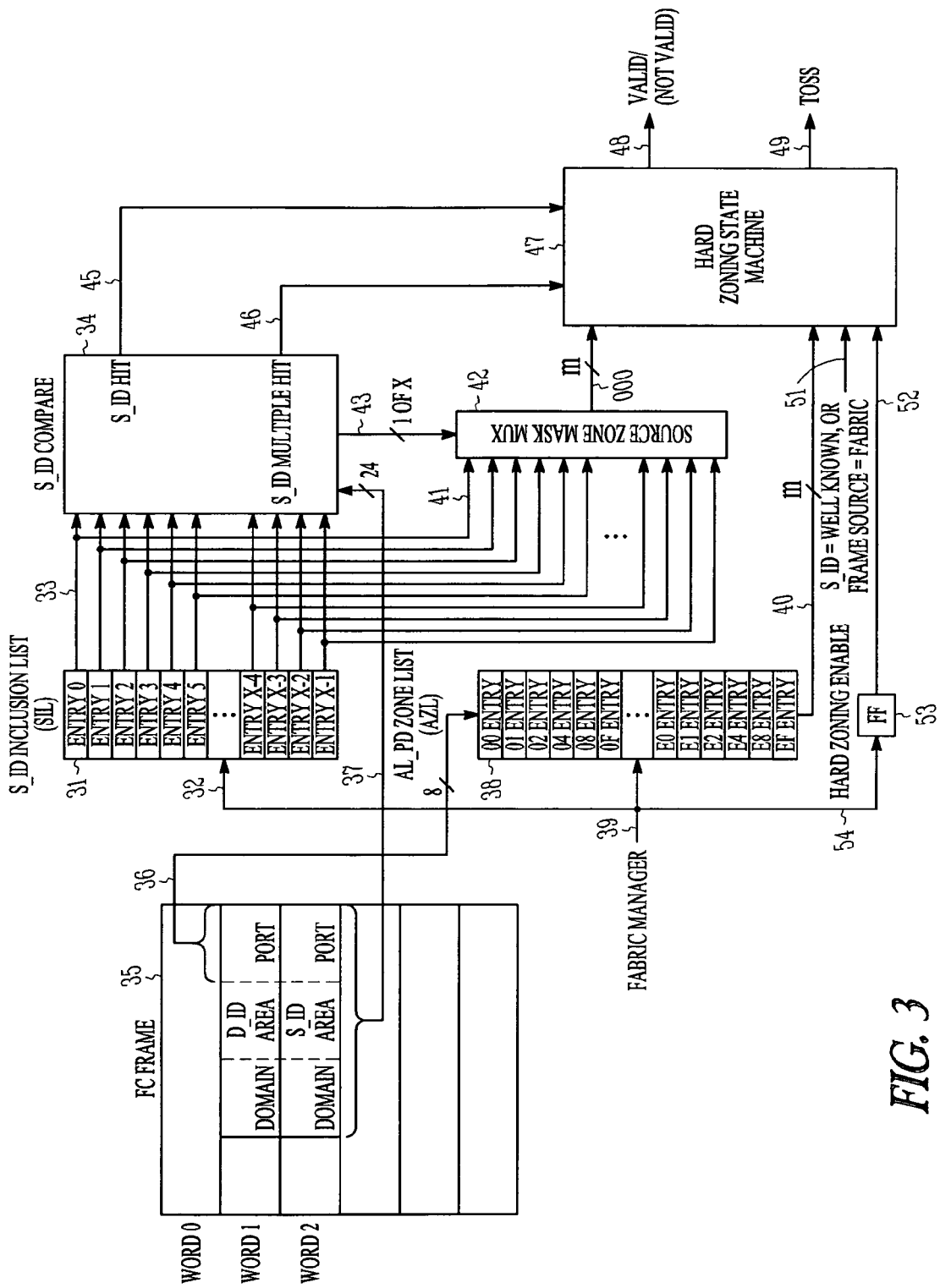
FIG. 3 is a block diagram of a portion of a fabric showing destination F_Port or FL_Port S_ID validation according to one aspect of the invention.

Destination fabric F_Port S_ID validation, described with reference to FIG. 3, ensures that outgoing frames are legal to send to the attached device(s). This feature requires an enable/disable control, because it should be enabled only on F_Ports and FL_Ports, but not on E_Ports.

Issues with Linear Tables.

Ideally, S_ID hard zoning would be performed in each host bus adapter (HBA) attached to the fabric. Each HBA would have its own unique zoning table. However, FC standards demand that zoning functions, hard and soft, be contained in the fabric.

A linear inclusion table would seem to be the most straightforward. However, to work for any address in the FC addressing range requires a very large table. For an F_Port, it would have an entry for every possible FC source address, which results in a depth of 256 Domains*256 Areas*256 Ports=16,777,216 table entries/port. If an FL_Port, the table has to also represent up to 126 loop devices, each of which may belong to different zones, which would require a unique linear inclusion table for each. The total number of inclusion table entries for an FL_Port would then be 256*256*256*126=2,113,929,216 table entries/port.

Shorter linear zone tables can be used, where a limited set of addresses, typically starting at the value Domain 1/Area 0, Port 0, and increasing sequentially up to the maximum table size implemented, can be economical. However, these tables cannot express any FC address and so greatly limits the fabrics that can be handled. For example, if the table had 512 entries, it could express all addresses in Domains 0x01 and 0x02, but none in Domain 0x03 through 0xEF.

The method described here utilizes a random table of 24-bit S_IDs, designed as CAM (Content Addressable Memory) where a frame S_ID can be compared against all CAM entries simultaneously seeking a comparison, or inclusion. Since the entries are 24-bit, the CAM can represent any FC address, but is limited to representing a subset of FC addresses far less than the FC maximum. For example, it could be expected that the CAM could economically hold 16-256 addresses, but could be less or more depending on the application and availability of resources.

The method has a single CAM per fabric port transmitter, even when the destination is an FL_Port, and so must work with as many as 126 loop or 256 NPIV destinations. For this reason, the CAM provides a source zone mask for each S_ID entry, which is compared against a destination zone mask contained in a separate lookup table.

There is a single destination zone mask table per fabric port transmitter, each entry representing a loop destination, NPIV, or AL_PD, and which typically has an entry for every one of the AL_PDs.

CAM-Based Inclusion Table.

This uses the S_ID Inclusion List (SIL), which describes which sources are allowed to send to this port, and if the destination is a loop or a F_Port with NPVIs, what zones each source belongs to.

It also uses the AL_PD Zone List (AZL) which describes what zones a destination AL_PA belongs to.

The S_ID Inclusion List (SIL).

SIL (31) is a programmable list of 24-bit S_IDs deemed by the fabric manager to belong to the same zones as the F Port or FL_Port in question, where each entry also has a 2-bit Compare Mask and a Source Zone Mask. SIL is written by the fabric manager (32) based on zone information. SIL (31) can be any size, but typically would contain as many entries as is economically feasible, to allow as many sources as possible, and to cover as many topologies as possible. SIL (31) provides S_ID compare information (33) to S_ID Compare (34) and the source zone mask (41) to the Source Zone Mask Mux (42).

Figure 4:
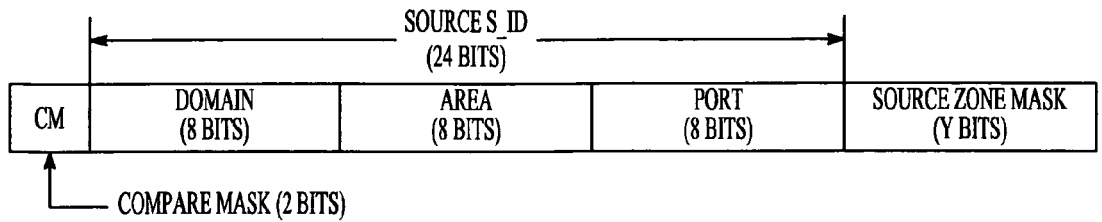
FIG. 4 is a diagram of a SIL (Source S_ID Inclusion List) entry which may be used in the validation of FIG. 3.

The Sil (31) entry format is shown in FIG. 4.

"Source S_ID" is 24 bits, and defines a legal source S_ID, if the "Compare Mask" value is not 00. Any S_ID within the FC address range of 0x0-FFFFFF can be expressed.

"Source Zone Mask" is a bit mask of variable size, which defines which zone or zones the source belongs to. See Zone Mask explanation below.

"Compare Mask" defines how the compare against the frame S_ID is to take place

00=Slot not valid. No compare is possible against this entry.

01=No mask. Domain/Area/Port are compared [see note 1 below]

10=Mask Port. Domain/Area are compared [see note 2 below]

11=Mask Area and Port. Domain is compared [see note 3 below]

[note 1] The entry represents exactly 1 source.

[note 2] The entry could represent 256 sources.

[note 3] The entry could represent 256*126=32,256 loop device sources or 256*256=65,536 NPIV sources.

S_ID Compare.

Figure 5:
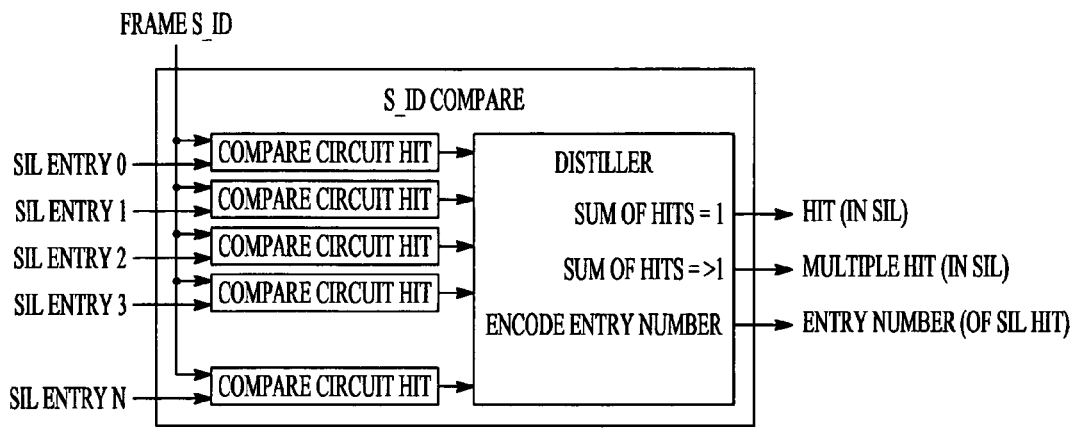
FIG. 5 is a block diagram of a portion of a fabric showing S_ID compare according to one aspect of the invention.

S_ID Compare (34) (see FIG. 5) is used to compare a frames' S_ID simultaneously to all entries in SIL (31) and present the results to the Hard Zoning State Machine (47). Each SIL (31) entry is compared against the frames S_ID (23:0) (37), using the S_ID value and Compare Mask of the SIL (31) entry (33). When a match is made, S_ID Compare (34) encodes the selected entry number into a value (43) that controls the Source Zone Mask Mux (42). The Hit (45) and Multiple Hit (46) status is shipped to the hard Zoning State Machine (47) for processing.

S_ID compare (34) distills the Hit/not status from every SIL entry compare as described above into a No Hit, Hit, or Multiple Hit status for the frame being processed. It also encodes the entry number of the hit into a binary value for use in the Source Zone Mask Mux.

Figure 6:
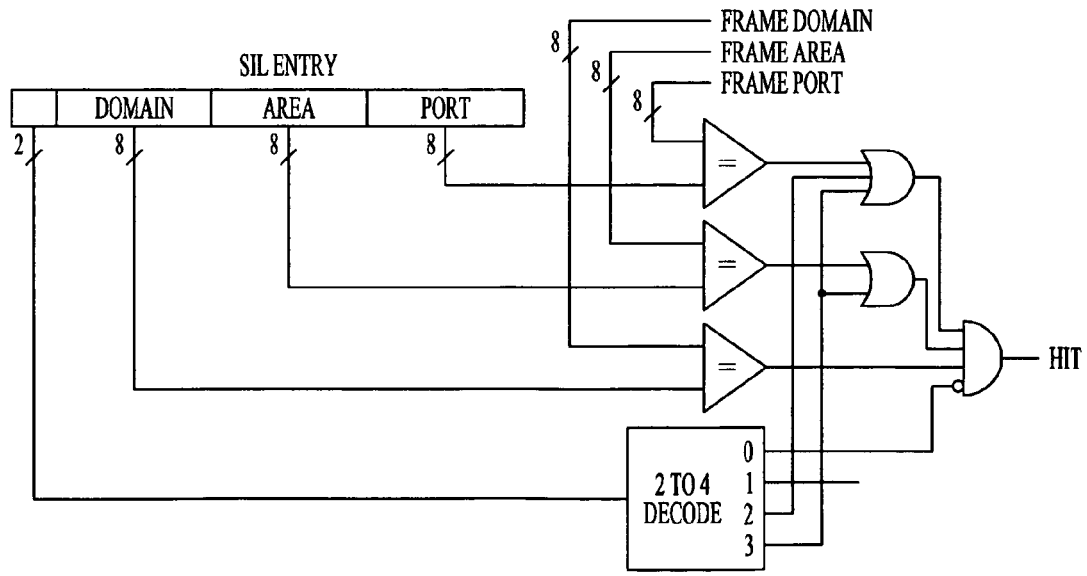
FIG. 6 is a block diagram of a portion of a fabric showing SIL entry compare according to one aspect of the invention.
Figure 7:
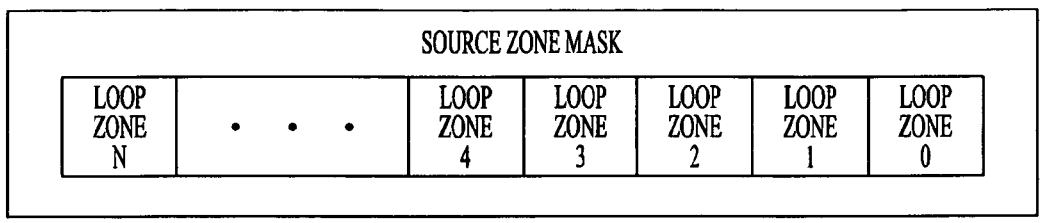
FIG. 7 is a diagram showing the Source Zone Mask format.
Figure 8:
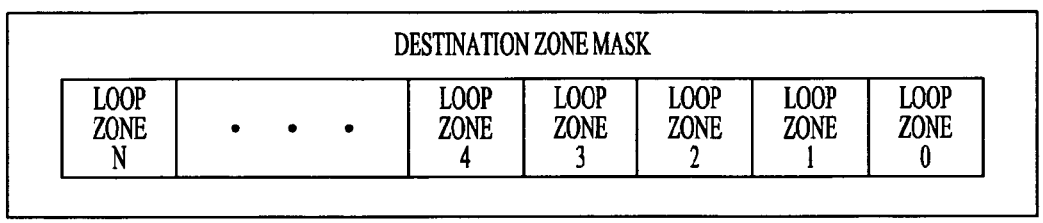
FIG. 8 is a diagram showing the Destination Zone Mask format.

There exists an autonomous compare circuit for every SIL entry, as shown in FIG. 6. The Hit/Not Hit output feeds the Distiller (see FIG. 5).

Distiller

The Distiller processes the results of SIL entry compares.

A Miss occurs when neither Hit nor Multiple Hit occurs. This causes the frame to be rejected.

A Hit occurs if a single entry compares. This is the first step in causing the frame to be accepted, the second being the SIL/AZL zone mask compare.

A Multiple Hit occurs if two or more entries compare. This causes the frame to be rejected. This is the way exceptions to ranges is implemented, and it also covers programming errors.

Entry Number is used on a Hit, to be a mux select for Source Zone Mask Mux.

Source Zone Mask Mux

The Source Zone Mask Mux (42) produces the zone mask associated with the source S_ID that matched the frame S_ID. The mux select (43) is produced by S_ID Compare (34) which is the encoded value of the SIL (31) entry that matched the frame S_ID. The Source Zone, Mask Mux output (44) is given to the Hard Zoning State Machine (47) which will compare it against the destination zone mask (40).

The source zone mask can contain any number of bits, depending on how many zones a F_Port or FL_Port is designed to handle. For example, a 4-bit zone mask implies that a F_Port or FL_Port can have up to 4 zones, and an 8-bit mask allows 8 zones. The size of the source zone mask in SIL (31) must be identical to the size of the destination zone mask in AZL (38).

The AL_PD Zone List (AZL)

AZL (38) (FIG. 3) is a 126-entry or 256-entry programmable table, one entry for every legal AL_PA or NPVI, that contains the zone mask for each destination loop port or NPVI. The frame AL_PD (36) provides the address to AZL (38), which produces the destination zone mask (40), which is given to the Hard Zoning State Machine (47) which will compare it against the source zone mask (44). AZL is written by the fabric manager (39) based on zone information. In order that the FL_Port and F_Port not be restricted in the choice of assignable AL_PAs, it is desirable for AZL to have 126 entries for loops, one for each legal AL_PA and 256 entries for NPVI respectively. Fewer entries are possible if restricting the AL_PA or Port range is acceptable.

The destination zone mask can contain any number of bits, depending on how many zones a F_Port or FL_Port is designed to handle. For example, a 4-bit zone mask implies that a F_Port or FL_Port can have up to 4 zones, and an 8-bit mask allows 8 zones. The size of the destination zone mask in AZL (38) must be identical to the size of the source zone mask in SIL (31).

Hard Zoning Enable

The Hard Zoning Enable (53) (FIG. 3) is a storage element programmed to enable or disable hard zoning on the port, and is written by the fabric manager (54) based on zoning and topology information. If hard zoning is employed in the fabric cloud, this will be set active on F_Ports and FL_Ports, and inactive on E_Ports.

The state of Hard Zoning Enable (52) is fed to the Hard Zoning State Machine (47) to condition the function. Hard Zoning Enable (52) is unique to the port, and is the same storage element that enables/disables S_ID validation on incoming frames.

The Hard Zoning State Machine

Figure 9:
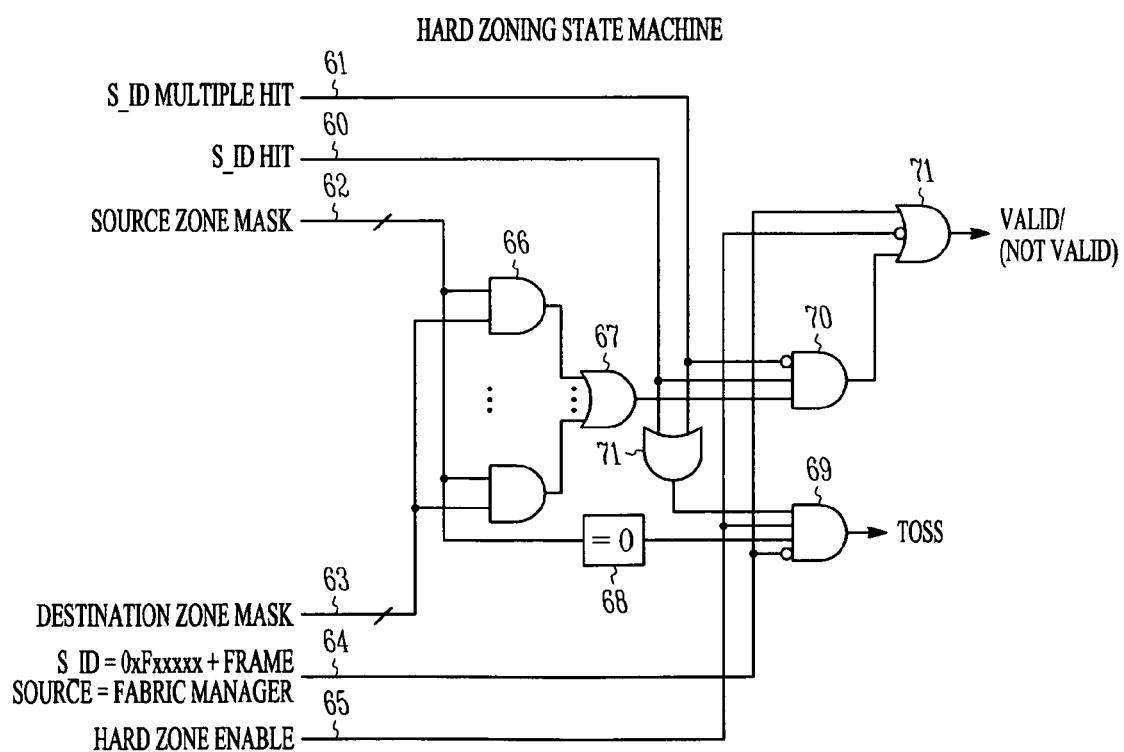
FIG. 9 is a block diagram of the Hard Zoning State according to one aspect of the invention.

The Hard Zoning State Machine (47) (FIG. 9) determines the disposition of all frames attempting to exit the fabric at a particular port.

If Hard Zoning is disabled;

All frames pass this function and, in lieu of other fabric functions, are forwarded out of the fabric to the destination node.

If Hard Zoning is enabled;

If the frame S_ID is in the range of 0xFxxxxx-FFFFFF, or if the frame originated in the switch box processor complex, hard zoning is ignored and the frame is routed normally.

If the port is an F_Port not supporting NPVI, only the S_ID compare is required. In this case, zone masks are logically irrelevant, but all zone masks in the SIL and all zone masks in AZL are set to some value (hex FF for example) that guarantees a zone mask compare in all cases. Note that the design could be implemented where an F_Port could disable the zone mask compare to avoid having to program the zone masks.

If the port is a F_Port supporting NPVI or a FL_Port, the compare is the same, but the zone masks are now relevant and must be programmed according to the actual zones in use.

If there is a hit in SIL, but the SIL zone mask=00, the frame is invalid. This is a deliberate way to reject known bad sources.

If there is a multiple hit in SIL, the frame is invalid. This implements the Exception To A Range function.

The Source Zone Mask (62) is provided by the Source Zone Mask Mux (42). The Destination Zone Mask (63) is provided by AZL (38). A bit-wise compare is made between the two masks in AND gates (66), all of which are ORed together in gate (67), which is active if any bit pair is set, and inactive if no bit pairs are set.

Function (68) is active if all source zone mask bits are zero. This is the test for a known bad S_ID that has been tagged in this way to insure its immediate tossing.

S_ID Hit (60) and S_ID Multiple Hit (61) are from S_ID Compare (34). Hard Zone Enable (65) is from the storage element of the same name (52). The translation for S_ID=0xFxxxxx+Frame Source=Fabric Manager (64) is made locally.

AND gate (69) commands the unconditional toss of frames whose source zone mask=0.

AND gate (70) commands that a frame is valid because it passes the general hard zoning test.

AND gate (71) commands the general frame valid.

EXAMPLE A

Multiple Hosts On F_Ports Connected to Multiple Storage Devices on FL_Ports

Figure 10:
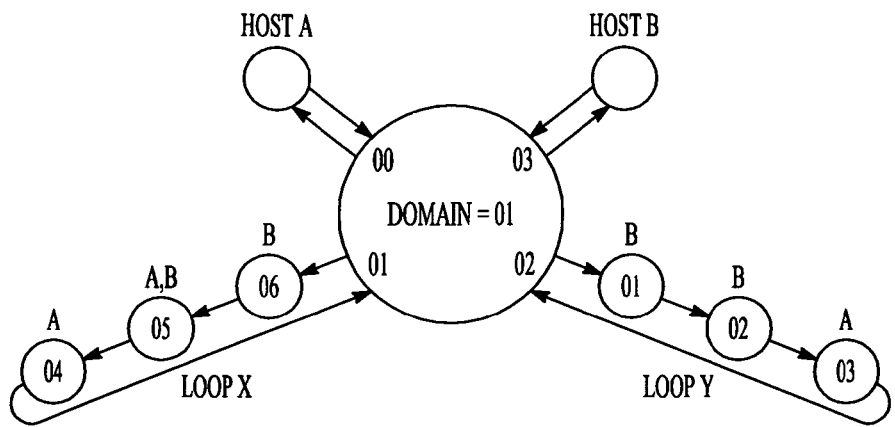
FIG. 10 is a diagram of an example (Example A) of the use of the invention in connecting multiple hosts to multiple storage devices, with hard zoning.

The diagram in FIG. 10 depicts two hosts attached to a switch that is the access to their storage. Hard zoning is set up so that Host A can only access disks in zone A, and Host B can only access disks in zone B. Host A and Host B can also access each other, and Host A and Host B share access to some disks. Zone masks have bit 0 assigned to zone A and bit 1 assigned to zone B.

The programmable values for each fabric port is as follows.
Port 01,00 (Domain 01, Area 00): Host A

TABLE 1

Example A SIL Contents

| SIL Entry | Compare Mask (bin) | Domain Value (hex) | Area Value (hex) | Port Value (hex) | Source Zone Mask (hex) | Comment |
|---|---|---|---|---|---|---|
| 0 | 02 | 01 | 03 | xx | FF | Host B |
| 1 | 01 | 01 | 01 | 04 | 01 | Loop x, alpa = 04 (belongs in zone A) |
| 2 | 01 | 01 | 01 | 05 | 03 | Loop x, alpa = 05 (belongs in zones A) & B) |
| 3 | 01 | 01 | 02 | 03 | 01 | Loop y, alpa = 03 (belongs in zone B) |

TABLE 2

Example A AZL Contents

| AZL Entry (hex) | Dest Zone Mask (hex) | Comment |
|---|---|---|
| All | FF | |

Port 01,01 (Domain 01, Area 01): Loop X

TABLE 3

Example A SIL Contents

| SIL Entry | Compare Mask (bin) | Domain Value (hex) | Area Value (hex) | Port Value (hex) | Source Zone Mask (hex) | Comment |
|---|---|---|---|---|---|---|
| 0 | 02 | 01 | 00 | xx | 01 | Host A (belongs to zone A) |
| 1 | 02 | 01 | 03 | xx | 02 | Host B (belongs to zone B) |

TABLE 4

Example A AZL Contents

| AZL Entry (hex) | Dest Zone Mask (hex) | Comment |
|---|---|---|
| 04 | 01 | belongs to zone A |
| 05 | 03 | belongs to zone A and B |
| 06 | 02 | belongs to zone B |
| Others | 00 | |

Port 01,02 (Domain 01, Area 02): Loop Y

TABLE 5

Example A SIL Contents

| SIL Entry | Compare Mask (bin) | Domain Value (hex) | Area Value (hex) | Port Value (hex) | Source Zone Mask (hex) | Comment |
|---|---|---|---|---|---|---|
| 0 | 02 | 01 | 00 | xx | 01 | Host A (belongs to zone A) |
| 1 | 02 | 01 | 03 | xx | 02 | Host B (belongs to zone B) |

TABLE 6

Example A AZL Contents

| AZL Entry (hex) | Dest Zone Mask (hex) | Comment |
|---|---|---|
| 01 | 02 | belongs to zone B |
| 02 | 02 | belongs to zone B |
| 03 | 01 | belongs to zone A |
| Others | 00 | |

Port 01,03 (Domain 01, Area=03): Host B

TABLE 7

Example A SIL Contents

| SIL Entry | Compare Mask (bin) | Domain Value (hex) | Area Value (hex) | Port Value (hex) | Source Zone Mask (hex) | Comment |
|---|---|---|---|---|---|---|
| 0 | 02 | 01 | 00 | xx | FF | Host A |
| 1 | 01 | 01 | 01 | 06 | 02 | loop x, alpa = 06 (belongs to zone B) |
| 2 | 01 | 01 | 01 | 05 | 03 | loop x, alpa = 05 (belongs to zone A and B) |
| 3 | 01 | 01 | 02 | 02 | 02 | loop y, alpa = 02 (belongs to zone B) |
| 4 | 01 | 01 | 02 | 01 | 02 | loop y, alpa = 01 (belongs to zone B) |

TABLE 8

Example A AZL Contents

| AZL Entry (hex) | Dest Zone Mask (hex) | Comment |
|---|---|---|
| All | FF | |

Configured as described above, the desired hard zoning for Example A, FIG. 10 is achieved.

EXAMPLE B

Wild Carding

Figure 11:
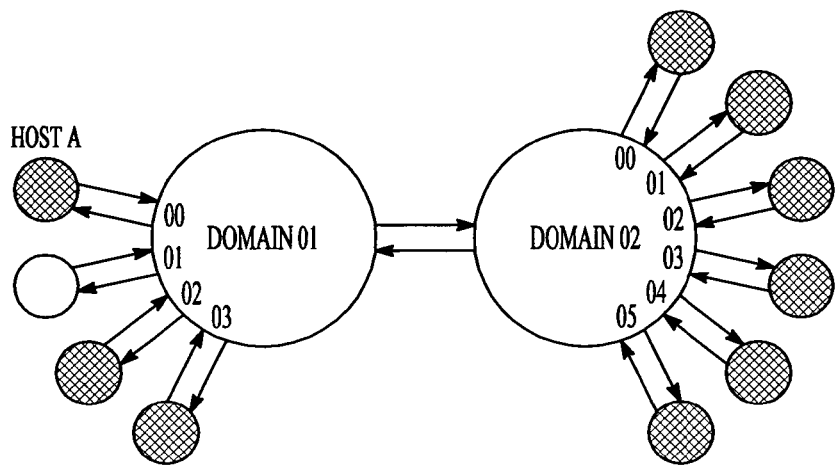
FIG. 11 is a diagram of an example (Example B) of the use the technique of wild carding, in connecting multiple hosts to multiple storage devices with hard zoning.

The example in FIG. 11 depicts how a single wild-carded SIL entry can represent all devices in a Domain. This shows Host A's view of the hard zoning, where some of the other ports in the same Domain are in zone A, and all of the ports in the other Domain are part of zone A.

Port 01,03 (Domain 01, Area=00): Host A

TABLE 9

Example B SIL Contents

| SIL Entry | Compare Mask (bin) | Domain Value (hex) | Area Value (hex) | Port Value (hex) | Source Zone Mask (hex) | Comment |
|---|---|---|---|---|---|---|
| 0 | 02 | 01 | 01 | xx | FF | device on Domain 1, Area 1 |
| 1 | 02 | 01 | 03 | xx | FF | device on Domain 1, Area 3 |
| 2 | 03 | 02 | xx | xx | FF | all devices on Domain 2 |

TABLE 10

Example B AZL Contents

| AZL Entry | Dest Zone Mask | Comment |
|---|---|---|
| All | FF | |

Configured as described above, the desired hard zoning for Example B. FIG. 11 is achieved. Note that this example shows how an entire Domain can be represented by one entry. This same method can be used to represent an entire Domain/Area with one entry, which allows all Ports to be represented with one entry.

EXAMPLE C

Wild Carding with Exceptions

Figure 12:
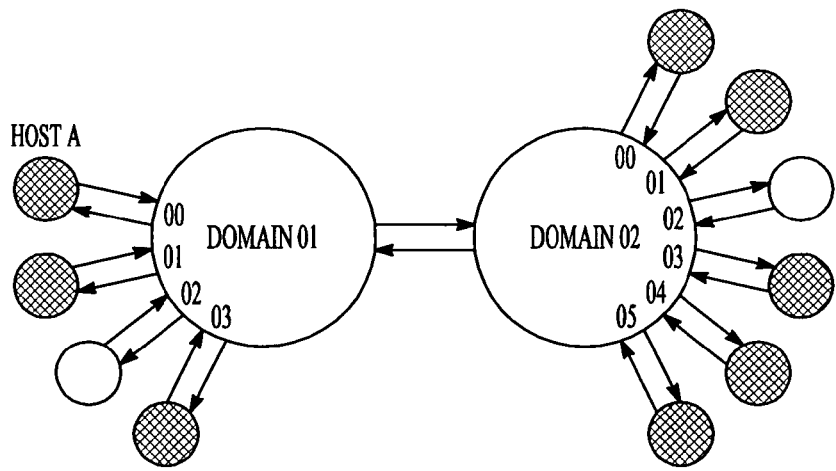
FIG. 12 is a diagram of an example (Example C) of the use the technique of wild carding with exceptions, in connecting multiple hosts to multiple storage devices with hard zoning.

The example in FIG. 12 depicts the same topology as for Example B but with an exception to a wild card. This shows Host A's view of the hard zoning, where some of the other ports in the Same Domain are in zone A, and most but not all of the ports in the other Domain are part of zone A.

Port 01,03 (Domain 01 Area=00): Host A

TABLE 11

Example C SIL Contents

| SIL Entry | Compare Mask (bin) | Domain Value (hex) | Area Value (hex) | Port Value (hex) | Source Zone Mask (hex) | Comment |
|---|---|---|---|---|---|---|
| 0 | 02 | 01 | 01 | xx | FF | device on Domain 1, Area 1 |
| 1 | 02 | 01 | 03 | xx | FF | device on Domain 1, Area 3 |
| 2 | 03 | 02 | xx | xx | FF | all devices on Domain 2 |
| 3 | 02 | 02 | 02 | xx | FF | exception to Domain 2 (exception) |

TABLE 12

Example C AZL Contents

| AZL Entry | Dest Zone Mask | Comment |
|---|---|---|
| All | FF | |

Configured as described above, the desired hard zoning for Example C, FIG. 12 is achieved. Note that 4 entries represent 7 sources. Note also that this shows wild carding a Domain with a single entry, but uses additional entries for exceptions to that Domain. This can also be used to wild card a Domain/Area, which covers all Ports, but use additional entries for each Port exception to the Domain/Area.

It will be seen from the above description that the present invention provides improved FC switch techniques, by providing roubust hardware-enforced zoning for data integrity and security. While specific embodiments and techniques have been described, it will be appreciated that the invention is not limited to those specific embodiments, and that many variations are possible within the scope of the invention.

What is claimed is:

1. A method of routing frames in Fibre Channel switching, comprising:
   receiving a frame at a source port of a Fibre Channel Fabric, wherein the frame includes a 24 bit source identifier (S_ID) and the frame includes a 24 bit destination identifier (D_ID) including 8 least significant bits to identify loop and N_Port ID Virtualization (NPIV) destinations;
   routing the frame from the source port to its destination port; and
   validating the frame at the destination port, wherein validating the frame at the destination port includes:
      producing a destination zone mask for arbitrated loops and NPIV using the 8 least significant bits of the D_ID received at the destination port, wherein producing the destination zone mask includes using a programmable table that includes an entry for every allowed 8 least significant bits and that includes a destination zone mask associated with the allowed 8 least significant bits of the D_ID for the entry;
      producing a source zone mask for the arbitrated loops and NPIV associated with the 24 bit S_ID received at the destination port;
      comparing the S_ID of the frame received at the destination port against all entries of S_ID stored in an inclusion list of sources permitted to be transmitted to the destination port; and
      if a match is found when comparing the S_ID of the frame against all entries of the S_ID, comparing the source zone mask associated with the S_ID against the destination zone mask, wherein the destination zone mask and the source zone mask have at least one bit that matches for valid frames; and
   if the frame is valid, transmitting the frame through the destination port.

2. A method of routing frames in Fibre Channel switching, comprising:
   receiving a frame at a source port of a Fibre Channel Fabric, wherein the frame includes a 24 bit source identifier (S_ID) and the frame includes a 24 bit destination identifier (D_ID) including 8 least significant bits to identify loop and N_Port ID Virtualization (NPIV) destinations;

routing the frame from the source port to its destination port; and validating the frame at the destination port, including:
producing a destination zone mask for arbitrated loops and NPIV using the 8 least significant bits of the D_ID received at the destination port and producing a source zone mask for the arbitrated loops and NPIV associated with the 24 bit S_ID received at the destination port; and comparing the source zone mask to the destination zone mask; and if the frame is valid, transmitting the frame through the destination port, wherein:

validating the frame at the destination port includes:
comparing the S_ID of the frame against all entries of S_ID stored in an inclusion list of sources permitted to be transmitted to the destination port; and if a match is found when comparing the S_ID of the frame against all entries of S_ID, comparing the source zone mask associated with the S_ID against the destination zone mask;

comparing the S_ID of the frame against all entries of S_ID stored in the inclusion list includes simultaneously comparing the S_ID of the frame against all entries of S_ID stored in the inclusion list;

the S_ID includes 16 least significant bits, and the inclusion list is configured to allow wild card designations to disable the comparison of either the 8 least significant bits of the S_ID or the 16 least significant bits of the S_ID;

if a single match is found when comparing the S_ID of the frame against all entries of S_ID, providing a hit to a hard zoning state machine that enables the frame to be accepted; and if more than one match is found when comparing the S_ID of the frame against all entries of S_ID, providing a multiple hit to the hard zoning state machine that rejects the frame.

3. The method of claim 1, wherein producing the destination zone mask includes programming the programmable table.

4. The method of claim 1, wherein the source port has a Native ID, and wherein:
routing the frame from the source port to its destination port includes validating the frame at the source port; and
validating the frame at the source port includes comparing the S_ID of the frame received at the source port to the Native ID of the source port.

5. A Fibre Channel switch, comprising:
a source port connectable to receive a frame, wherein the frame includes a 24 bit source identifier (S_ID), and the frame includes a 24 bit destination identifier (D_ID) including 8 least significant bits to identify loop and N_Port ID Virtualization (NPIV) destinations;
a router operative to route the frame through a fabric of the switch;
a destination port configured to receive the frame routed through the fabric;
a destination port S_ID validator configured to validate the frame received at the destination port, the validator including:
an inclusion table of allowed S_IDs;
an S_ID comparator configured to compare the S_ID of the frame received at the destination port to the inclusion table of allowable S_IDs to identify an S_ID match;
a source zone mask generator configured to generate a source zone mask for the frame with the S_ID match;
a destination zone mask generator configured to compare the 8 least significant D_ID bits of the frame received at the destination port to a list of allowable loop and NPIV destinations and generate a destination zone mask if the 8 least significant bits of the frame received at the destination port is allowable; and
a hard zoning comparator configured to compare the destination zone mask to the source zone mask, wherein the destination zone mask and the source zone mask match for valid frames.

6. The Fibre Channel switch of claim 5, wherein the S_ID comparator is configured to simultaneously compare the S_ID of the frame received at the destination port to all allowable S_IDs in the inclusion table.

7. The Fibre Channel switch of claim 5, wherein the inclusion table is configured to express a designation defining a range of allowable S_IDs exceptions to the range.

8. The Fibre Channel switch of claim 5, wherein:
the S_ID comparator is configured to generate an S_ID hit signal when a single entry of the allowable S_IDs matches the S_ID of the frame received at the destination port; and
the hard zoning comparator is configured to receive the S_ID hit signal, and enable the frame received at the destination port to be accepted in response to receiving the S_ID hit signal.

9. The Fibre Channel switch of claim 5, wherein:
the S_ID comparator is configured to generate an S_ID multiple hit signal when more than one entry of the allowable S_IDs matches the S_ID of the frame received at the destination port; and
the hard zoning comparator is configured to receive the S_ID multiple hit signal, and reject the frame received at the destination port.

10. The Fibre Channel switch of claim 5, further comprising a programmable hard zoning enable storage element, wherein the hard zoning comparator is configured to be disabled or enabled based on a programmed state of the hard zoning enable storage element.

11. The Fibre Channel switch of claim 5, wherein:
the S_ID comparator is configured to generate a mux select signal representative of the allowable S_ID that resulted in the S_ID match; and
the source zone mask generator is a mux configured to receive mux select signal, and is configured to generate the source zone mask for the allowable S_ID that resulted in the S_ID match.

12. The Fibre Channel switch of claim 5, wherein inclusion table of allowed S_IDs is configured to be programmed by a fabric manager, and the list of allowable 8 least significant D_ID bits is configured to be programmed by the fabric manager.

13. The Fibre Channel switch of claim 5, wherein the source port includes a Native ID, the switch further comprising an S_ID validator associated with the source port and operable to compare the frame S_ID to the Native ID of the source port.

14. A Fibre Channel switch, comprising:
means for receiving a frame at a source port, wherein the frame includes a 24 bit source identifier (S_ID), and the frame includes a 24 bit destination identifier (D_ID) including 8 least significant bits to identify loop and N_Port ID Virtualization (NPIV) destinations;
means for routing the frame from the source port to its destination port; and means for validating the frame at the destination port before accepting the frame for transmission at the destination port, wherein the means for validating the frame at the destination port includes:
- means for producing a destination zone mask for arbitrated loops and NPIV using the 8 least significant bits of the D_ID received at the destination port, wherein the means for producing the destination zone mask includes means for using a table that includes an entry for every allowed 8 least significant bits and that includes a destination zone mask associated with the allowed 8 least significant bits of the D_ID for the entry;
- means for producing a source zone mask for the arbitrated loops and NPIV associated with the S_ID received at the destination port;
- means for comparing the S_ID of the frame received at the destination port against all entries of S_ID stored in an inclusion list of sources permitted to be transmitted to the destination port; and
- means for comparing the source zone mask associated with the S_ID to the destination mask if a match is found when the S_ID of the frame is compared against all entries of the S_ID, wherein the destination zone mask and the source zone mask have at least one bit that matches for valid frames.

15. The Fibre Channel switch of claim 14, wherein the means for validating the frame at the destination port includes means for defining a range of allowable S_ID values and at least one exception to the range.

16. The Fibre Channel switch of claim 14, wherein the source port includes a Native ID, and the means for routing the frame from the source port to its destination port includes means for comparing the S_ID of the frame received at the source port to the Native ID of the source port to validate the frame at the source port.

* * * * *

UNITED STATES PATENT AND TRADEMARK OFFICE
CERTIFICATE OF CORRECTION

PATENT NO. : 7,978,695 B2  
APPLICATION NO. : 11/858684  
DATED : July 12, 2011  
INVENTOR(S) : William R. George et al.

Page 1 of 1

It is certified that error appears in the above-identified patent and that said Letters Patent is hereby corrected as shown below:

On the cover page, item (57), under "Abstract", in column 2, line 1, delete "Fiber" and insert -- Fibre --, therefor.

On the cover page, item (57), under "Abstract", in column 2, line 6, delete "Fiber" and insert -- Fibre --, therefor.

On the cover page, item (57), under "Abstract", in column 2, line 12, delete "entry-by entry" and insert -- entry-by-entry --, therefor.

On page 2, under "Other Publications", in column 2, line 17, after "Application" delete "Application".

In column 3, line 65, delete "E_$_{Ports.}$" and insert -- E_Ports. --, therefor.

In column 4, line 57, delete "F Port" and insert -- F_Port --, therefor.

In column 6, line 23, delete "F Port" and insert -- F_Port --, therefor.

In column 6, line 33, delete "Sil" and insert -- SIL --, therefor.

In column 7, line 61, delete "F_$_{Ports and Fl}$_Ports," and insert -- F_Ports and FL_Ports, --, therefor.

In column 11, line 31, delete "B." and insert -- B, --, therefor.

In column 11, line 48, delete "(Domain 01" and insert -- (Domain 01, --, therefor.

In column 12, line 18, delete "roubust" and insert -- robust --, therefor.

Signed and Sealed this  
Thirteenth Day of September, 2011

David J. Kappos  
*Director of the United States Patent and Trademark Office*